United States Patent [19]

Thomanek

[11] Patent Number: 5,064,278
[45] Date of Patent: Nov. 12, 1991

[54] OPTICAL EQUIPMENT MOUNTING DEVICE

[75] Inventor: Walter Thomanek, Montreal, Canada

[73] Assignee: Allied-Signal Inc., Morris Township, Morris County, N.J.

[21] Appl. No.: 325,748

[22] Filed: Mar. 20, 1989

[30] Foreign Application Priority Data

May 12, 1988 [CA] Canada ................................. 566575

[51] Int. Cl.[5] ....................... G02B 23/00; G02B 27/02
[52] U.S. Cl. .................................. 359/480; 359/400; 359/896
[58] Field of Search ............................... 350/542–557, 350/145, 146, 139, 174, 319, 537–538, 567, 144; 2/5–6, 10, 410–422, 438

[56] References Cited

U.S. PATENT DOCUMENTS

| | | | |
|---|---|---|---|
| 4,449,787 | 5/1984 | Burbo et al. | 350/549 |
| 4,660,943 | 4/1987 | Ellis | 350/547 |
| 4,670,912 | 6/1987 | Hart | 2/6 |
| 4,689,834 | 9/1987 | McCarthy et al. | 350/549 |
| 4,755,664 | 7/1988 | Holmes et al. | 350/174 |

Primary Examiner—Rodney B. Bovernick
Assistant Examiner—Thong Nguyen
Attorney, Agent, or Firm—Christopher N. Malvone; Howard G. Massung; Robert A. Walsh

[57] ABSTRACT

A mounting device and head support structure for carrying optical equipment, such as night vision goggles, on the head of a person, and including a structure which permits ready mounting and dismounting of the mounting device and the optical equipment carried thereby and also easy adjustment of the optical equipment in a vertical direction as well as along the line of vision after mounting. The mounting device includes a lever mounted in a housing and engageable by the user's hand when the mounting device and the optical equipment are grasped for mounting, and the lever is movable to a position to unlock engaging parts so as to permit the mounting device to move relative to the head support assembly and/or permit the part of the mounting device to which the optical equipment is attached to move relative to the housing. The single lever can be activated to accomplish both mounting, dismounting and adjustment in the two directions indicated above. Additionally, an adjustment member is provided to accomplish a desired tilt of the optical equipment relative to the normal line of vision. The head support assembly includes a main head piece which has a relatively rigid portion in the front and more flexible side and top pieces for fitting to a variety of head shapes.

29 Claims, 7 Drawing Sheets

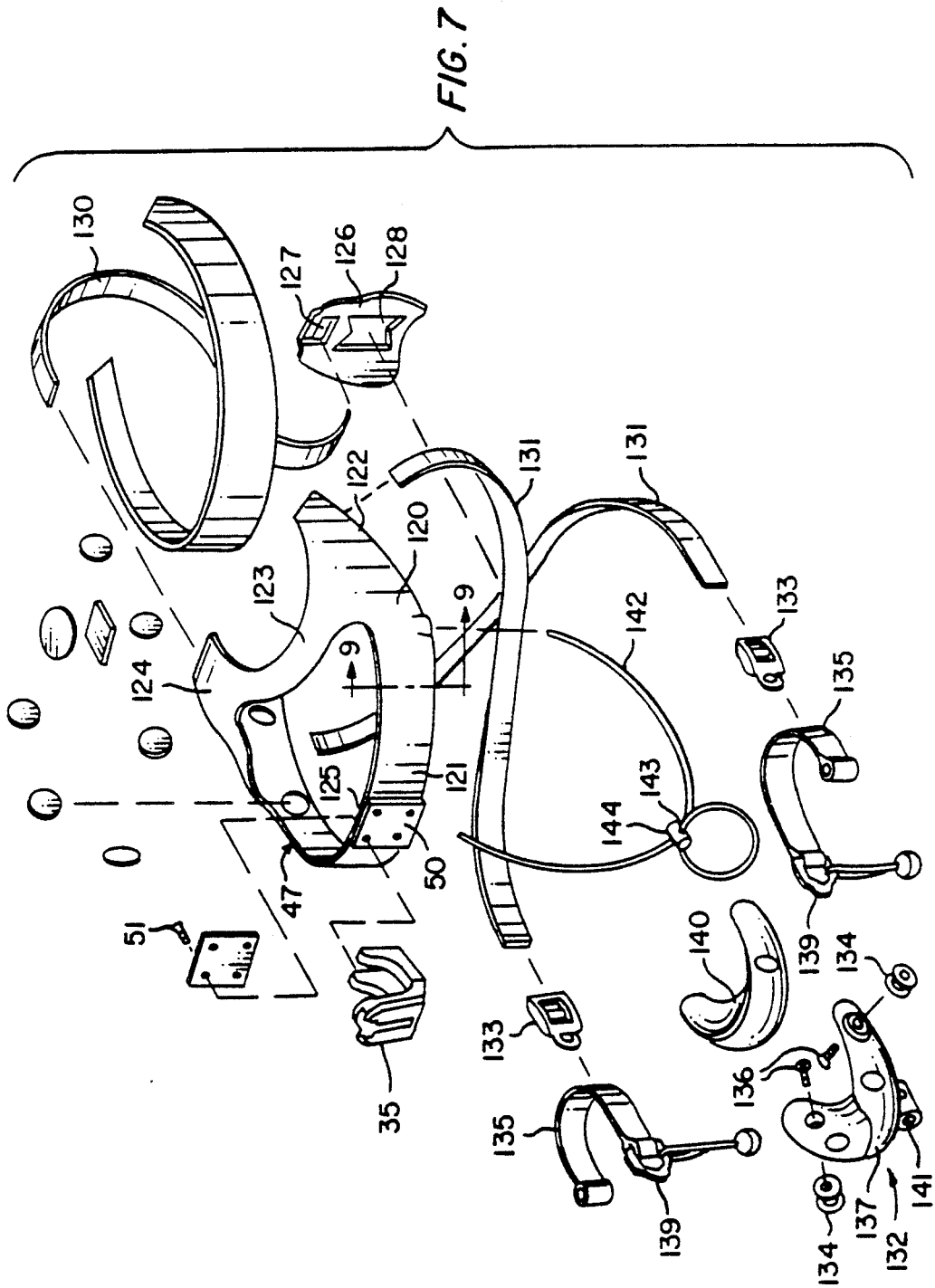

OPTICAL EQUIPMENT MOUNTING DEVICE

BACKGROUND OF THE INVENTION

1. Field of the Invention

The present invention relates to a mounting apparatus for supporting optical equipment, such as night vision goggles, on the head of a person in a manner which permits firm support and ready adjustment.

2. Description of the Related Art

There are numerous optical device in use for which it is desirable for the user to have it supported in his line of vision without having to hold the device. Night vision goggles which are used by the military are such devices which clearly must be mounted so as to permit the user to have his hands free. Because such goggles are used by persons having a wide variety of physical characteristics, any mounting apparatus for them must permit a wide range of adjustments with respect to the positioning of the goggles in a direction perpendicular to the viewer's line of vision and also longitudinally, i.e., on an axis parallel to the line of vision. Even when the same person is mounting and dismounting optical equipment frequently, it is necessary to be able to readily adjust the position of the equipment each time it is mounted for a number of reasons, such as the fact that the head support assembly to which the equipment is attached may not always be positioned in exactly the same manner.

Moreover, in order to permit the wearer to assume a number of positions, such as a lying position, while viewing through the equipment, it is preferable to also be able to selectively adjust the angle of the line of viewing through the goggles with respect to what is the normal line of vision of the wearer. It is important when the mounting device is being used under conditions to which the military is exposed that the device can not only be easily attached to a head support apparatus but that it can be adjusted in both of the above indicated directions by using one hand, preferable by the same hand by which the optical device has been grasped for the initial mounting on the head support apparatus. The above are characteristics which have not been general present in mounting devices now in use.

Also, under certain conditions of use, such as in combat, the mounting device, the head support apparatus and the manner in which the mounting device is mounted on the heat support apparatus must be extremely dependable so not permit the goggles to become readily detached or dislocated if subjected to relative severe shock because an unexpected loss of the device at a critical moment could put the wearer at a disadvantage or cause injury to him. Again, known equipment have not fully achieved reliability or sufficient durability while still providing the necessary adjustment features. Not only is durability in the mounting device necessary, but it is clear that the reliability of the optical device is no better than the dependability of the head support apparatus, the function of which is to hold the mounting device in place.

SUMMARY OF THE INVENTION

It is an object of the present invention to provide a durable mounting arrangement which permits easy mounting and adjustment of optical equipment.

According to one aspect of the present invention, there is provided a mounting device for adjustably positioning optical equipment on a viewer's head, the mounting device being mountable on a head support assembly worn by the viewer, and including a housing with first guide means disposed between the housing and a mounting means connectable to the head support assembly for permitting movement of the housing relative to the head support assembly along a substantially vertical axis extending normal to the viewer's normal line of vision. A base means is provided which has attachment means for connecting the optical equipment thereto. A second guide means is disposed between the base means and the housing for permitting movement of the base means relative to the housing along a horizontal axis extending substantially parallel to the line of vision. Locking means is associated with each guide means for independently preventing the relative movement in each guide means, and a manually operable unlocking member is mounted in the housing and is movable from a locking position to unlocking positions for selectively actuating each of the locking means to effect unlocking of the locking means.

According to another aspect of the invention, there is provided a mounting device, which is mountable on a head support assembly worn by a viewer, and permits adjustable positioning of optical equipment on the viewer's head in front of his line of vision. The mounting device includes a pair of guide means, each having a slide member and track means for permitting relative back and forward movement of the slide along an single axis in the direction of the longitudinal axis of the track member. A housing member and a base means are provided, the base means having attachment means for connection to the optical equipment. One of the guide means is disposed between the housing member and the head support assembly and the other is disposed between the housing member and the base member. One of the guide means is oriented to permit relative movement on a vertical axis normal to the line of vision of the viewer, and the other is oriented to permit relative movement on a horizontal axis parallel to the line of vision. A releasible lock means is associated with each guide means for preventing the relative movement in the guide means so that on release of the lock means, the level of the optical equipment and the distance of the optical equipment in front of the viewer may be selectively adjusted.

Yet another aspect of the invention resides in a head support assembly of the type used with a mounting device for optical equipment, the assembly including a composite head piece comprising a lower U-shaped band portion having an inner surface at the front thereof to fit across the forehead of the wearer and inner surfaces on the inside of rearwardly extending side leg portions of U-shape band for placement along the side of the head of the wearer, and an upper band portion formed integrally with the side leg portions and extending upwardly and then inwardly to a central portion, the upper band portion and the central portion defining inner surfaces which overlie the crown of the wearer's head, the head piece being a molded laminate structure formed by an inner layer of tough resilient material sandwiched between layers of a carbon fiber material.

BRIEF DESCRIPTION OF THE DRAWING

The accompanying drawings show, as an example, one embodiment of the invention, and wherein:

FIG. 7 is an exploded perspective view of the head support assembly of FIG. 1,

DESCRIPTION OF THE PREFERRED EMBODIMENTS

Figure 1:
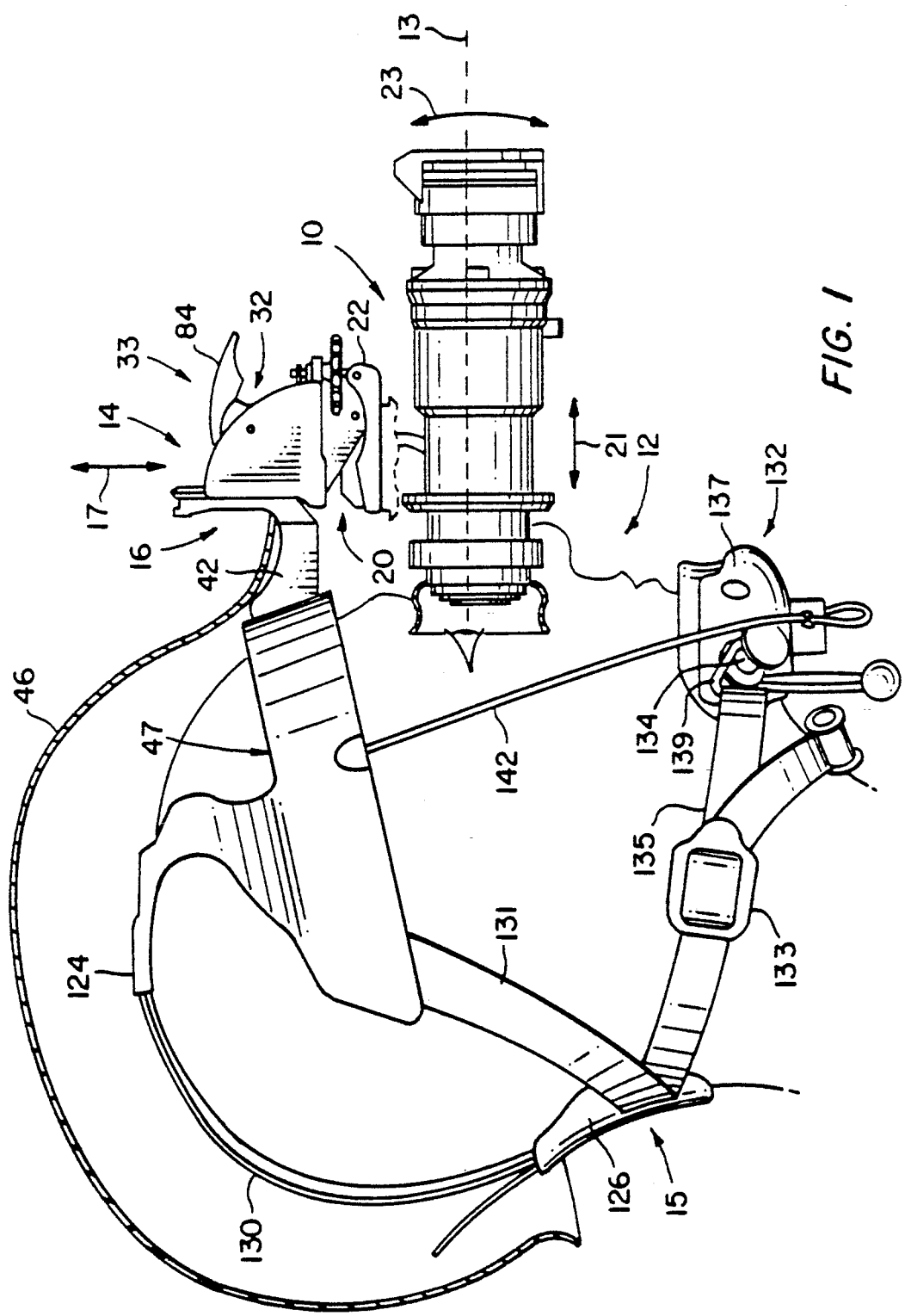
FIG. 1 is a side view on a mounting device in a mounted condition on a head support assembly according to the present invention.

In FIG. 1, the reference character 10 denotes optical equipment, such as night goggles, mounted in a position in front of the normal line of vision 13 of a person, hereinafter termed the wearer 12. The optical equipment 10 is supported in the position by a mounting device 14 carried on the front of a head support assembly 15 worn by the wearer 12. As will be described in more detail below, the head support assembly 15 is fixed firmly to the head of the wearer, and once adjusted, the mounting device 14, which is detachably affixed to a front portion of the head support assembly 15, holds the optical equipment against relative movement with respect to the head support assembly, and thus, the wearer's head. However, the mounting device 14 includes a first guide means 16 which allows adjustment of the optical equipment 10 in an up and down direction, or what is normally the vertical direction. This direction, as indicated by the arrow 17, is, therefore, perpendicular to the line of vision 13. There is further provided a second guide means 20 which permits adjustment of the optical equipment 10 in a back and forth or longitudinal direction, i.e., in a direction parallel to the normal line of vision 13, as denoted by the arrow 21, this direction being perpendicular to the direction permitted by the guide means 16, and is, therefore, a direction which is normally horizontal. An adjustment means 22 is also provided for the purpose of allowing tilt or angular adjustment, in an up and down direction in a vertical plane, i.e., about a horizontal transverse axis, which is an axis provided by a pin 19, which is perpendicular to the line of vision 13. Adjustment of the means 22 moves the optical equipment in the direction indicated by curved arrow 23.

Figure 3:
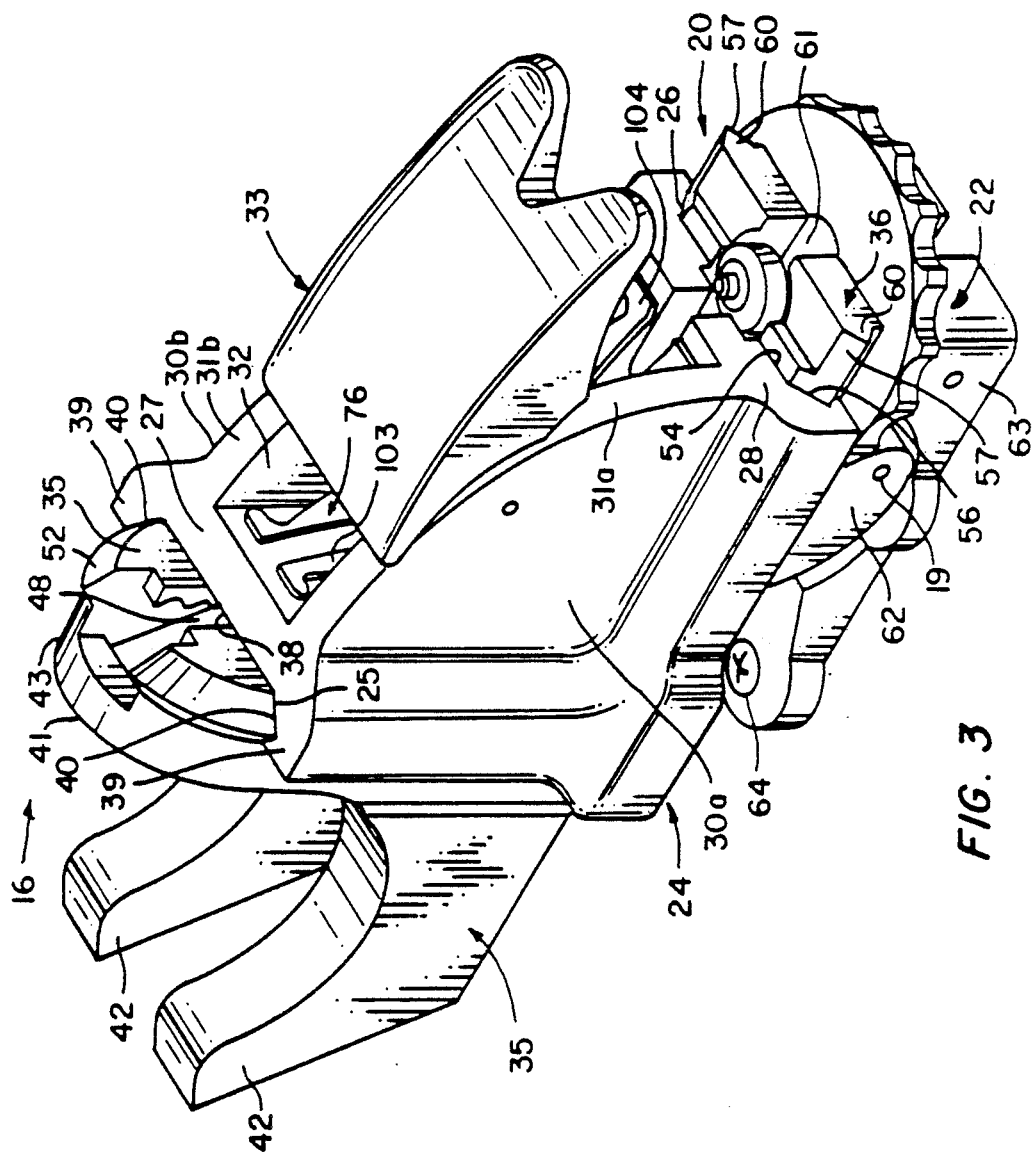
FIG. 3 is an enlarged perspective view of the mounting device as shown in FIG. 2.
Figure 4:
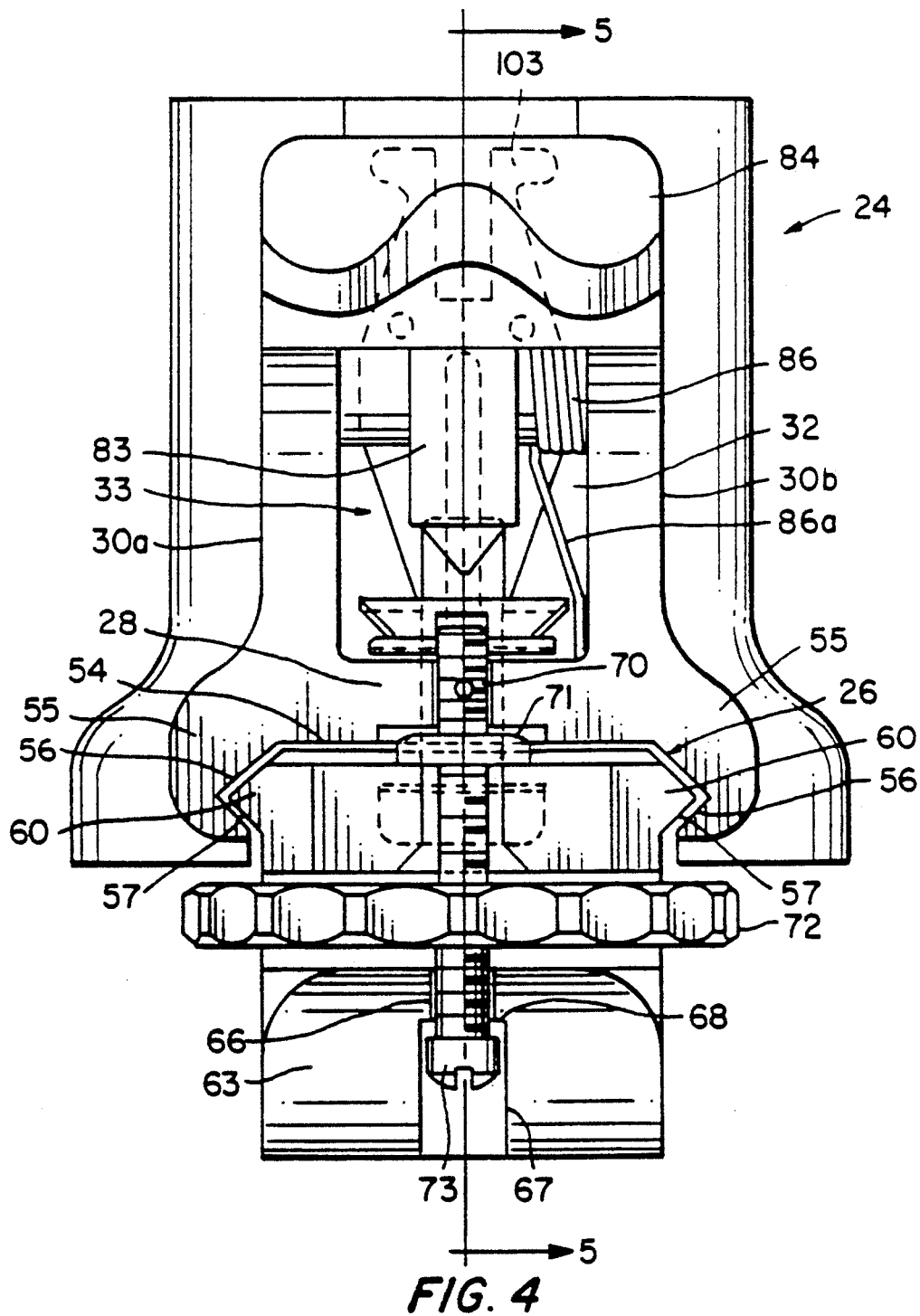
FIG. 4 is an enlarged front view of the mounting device as shown in FIG. 2.

. The mounting device 14 includes a housing 24, which may be a cast or molded member having a vertical track 25 formed in rear side thereof and horizontal track 26 formed in a lower side thereof. The tracks 25 and 26 are separated from a hollow interior of the housing 24 by vertical back wall 27 and horizontal bottom wall 28, respectively, (FIG. 3). Extending forward from back wall 27 and upwardly from bottom wall 28 is a pair of spaced side walls 30a and 30b having curved front edges 31, 31, which, in the main, 30a and 31b, respectively. The curved front edges are arcuate, extending from the top of the back wall to the front of the bottom wall. Contained in a hollow space 32 provided between the side walls 30a and 30b is a locking means 33 for the guide means 16 and 20 which will be described in more detail below.

The guide means 16 and 20 are similar in structure, each including their respective tracks 25 and 26, which receive slide members 35 and 36, respectively. The slide member of each of the guide means is restricted to sliding movement in the direction of the longitudinal axis of the track. In the case of guide means 16, the slide member 35 is the member which is normally stationary, at least relative to the head of the wearer, and the track 25 moves relative to the slide member 35 during the mounting and adjustment operation, but in any event, as will become more apparent below, it is the selective relative movement between the slide member 35 and the track 25 which accomplishes the adjustment of the optical equipment 10 in the direction of arrow 17 shown in FIG. 1 and the selective relative movement between the slide member 36 and the track 26 which accomplishes the adjustment of the optical equipment in the direction of arrow 21.

Figure 6:
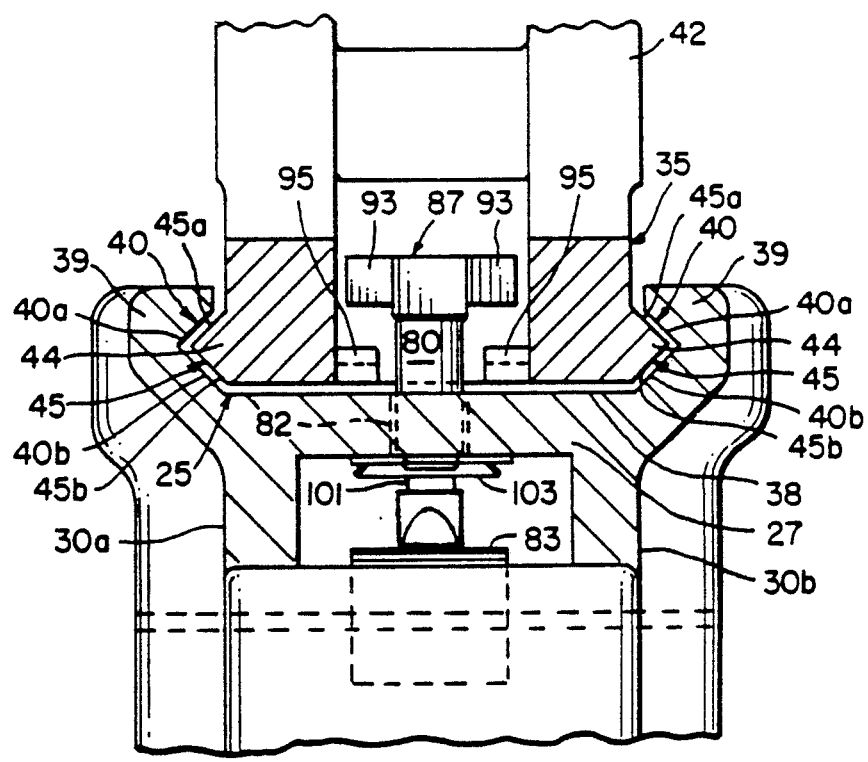
FIG. 6 is a cross sectional as seen from line 6—6 of FIG. 5 showing a pin and track arrangement as used in a guide means of the mounting device of FIG. 2.

The vertical track 25 of the guide means 16 is in the form of a rear facing channel defined by the rear surface 38 of the back wall 27 and a pair of rearwardly directed flanges 39, 39. The opposed side surfaces 40, 40 provided by the flanges 39, 39 inside the channel of track 25 are V-shaped providing surfaces 40a and 40b, as best seen in FIG. 6. The slide member 35 of the guide means 16 has a main slide portion 41 and rearwardly projecting mounting legs 42 by which the slide member 35 is attached to the head support assembly 15. The forward ends of legs 42 are integrally formed with a body portion 43 of the slide member which connects at the front therewith to a pair of slide rails 44, 44 separated by an elongated slot 48. The mounting legs 42, the body portion 43 and rails 44, 44 are preferably a single integral unit which may be molded, for example from a tough durable plastic, such as NYLON.

The side rails 44, 44 have longitudinally extending V-shaped side edges 45, 45, each defined by surfaces 45a and 45b and being shaped to be closely received in the V-shaped side surfaces 40, 40 of the track so that the movement of the slide member relative to the track 25 is limited to a direction corresponding to the longitudinal axis of the track.

Figure 2:
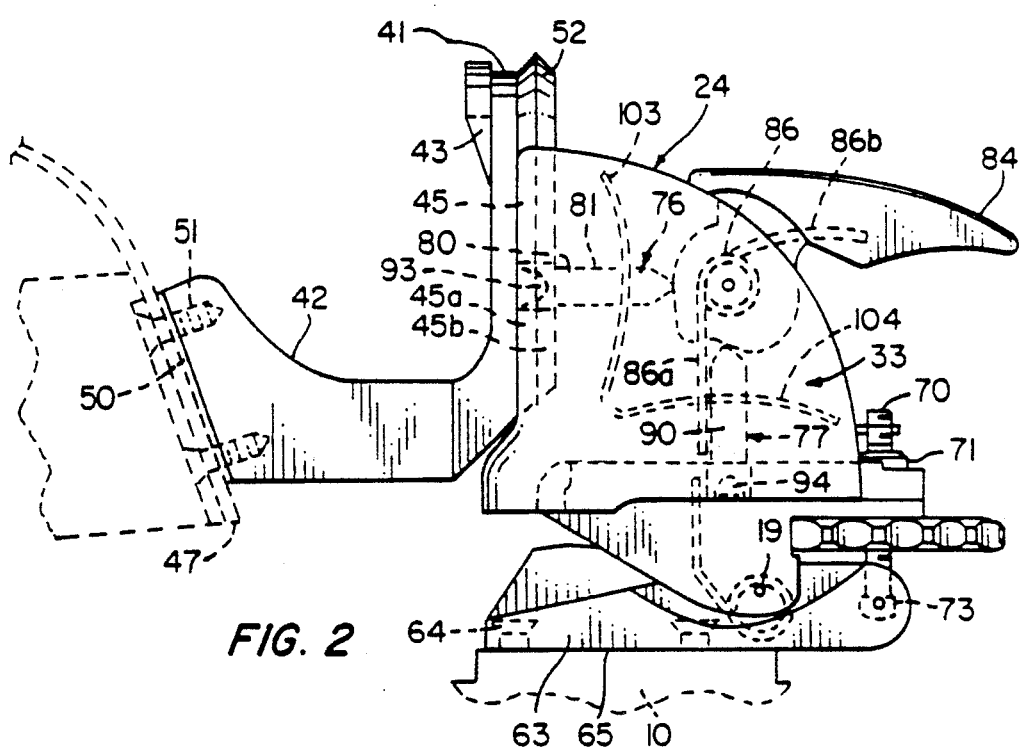
FIG. 2 is an enlarge side view of the mounting device shown in FIG. 1.

The slide member 35 may be permanently affixed to the head support assembly to facilitate mounting and dismounting of the mounting device on the head support assembly which would be worn continuously by the wearer, such as under a helmet 46 shown in FIG. 1, at a time when it is expected that the optical equipment, such as night goggles, may be needed at any moment. More specifically, the slide member 35 may be permanently affixed to a head piece 47 of the head support assembly, the rear ends of mounting legs being secured to a flat front surface 50 of the head piece 47 at the very front thereof by fastening means 51, such as screw, which are threaded into the mounting legs 42 (FIG. 2). The mounting legs 42 may be of sufficient length so that the main slide portion 41 is held in a vertical orientation in front of the helmet, as shown in FIG. 1.

As is most apparent in FIG. 3, the upper ends of the V-shaped side edges of the side rails of the slide member have upper portions 52 which curve smoothly inward toward each other so as to provide a rounded upper end to the side rails. Thus, when it is wished to install the optical equipment, the mounting device 14, which carries the optical equipment, is grasped by one hand of the wearer and the track 25 is slid down over the slide member 35, the rounded portion at the upper end of the side rails assisting in guiding the upper end of the side rails into the channel of the track 35. Once mounted, it can be seen that the movement of slide member 35 in track 25 of guide means 16 permits vertical movement of the housing 24 relative to the head support assembly 15 and thus to the head of the wearer.

The structure of the guide means 20 is similar to that of guide means 16 except that it need not be constructed to permit ready assembly and disassembly because the mounting device and the optical equipment carried thereby are usually kept as a unit for mounting on the head support assembly as described above. The housing 24 has a downwardly open channel providing track 26, the track being formed by the lower surface 54 of the bottom wall 28 and downwardly projecting side flanges 55, 55. The opposing opposed inner surfaces 56 of the flanges 55 are V-shaped. The slide member 36 is mounted for sliding movement in the direction of the longitudinal aixs of the horizontal track 26 formed by the downwardly open channel, the side edge surfaces 57 of the slide also being V-shaped to complement the shape of the V-shaped surfaces 56 of the flanges 55, 55. The slide member 36, like the slide member 35 includes two longitudinally extending slide rails 60, 60 separated by a central slot 61, and it further has downwardly projecting flanges 62 formed integrally with the rails and between which is mounted a base member 63. The base member has a lower surface 65 against which the optical equipment 10 is secured by fastening means 64 which may be screws which pass through openings in the base member and are threaded into openings in the optical equipment.

The base member 63 is connected to the flanges 62 by previously mentioned pin 19 which allows base member 63 to pivot about a horizontal transverse axis relative to the housing 24. At the front of the base member 63 there is provided a bore 66 extending through the base member. Also extending upwardly into the base member 63 is a counter bore 67 which is coaxially with the bore 66 so as to provide a shoulder 68. A screw means for adjusting the tilt of the optical equipment includes an externally threaded, elongated shaft 70 extends through the bore 66 and is threaded through an internally threaded member 71 fixed to the rails 60, 60 of the slide member 36 thereabove. The threaded shaft has fixed thereto a knurled wheel 72 which may be turned by the thumb or a finger of the wearer so as to rotate the shaft 70 in either direction and thereby adjust the amount the shaft is threaded through the internally threaded member 71. The lower end of the threaded shaft is provided with a head 73 which bears against the shoulder 68. A coil spring 74, which encircles the pin 19, and has outer ends 74a and 74b, one each engaging the slide member 36 and the base member 63, respectively, for biasing the base member 63 in a clock-wise direction as viewed in FIG. 5 so that the shoulder 68 is held against the head 73 and there is, therefore, no slack movement of the base member about the pin 19 and relative to the slide member. It can be seen that by tilting the optical equipment, a more convenient angle can be obtained when the wearer is in a prone position, and in fact allows the wearer to maintaining a more concealed position.

Figure 5:
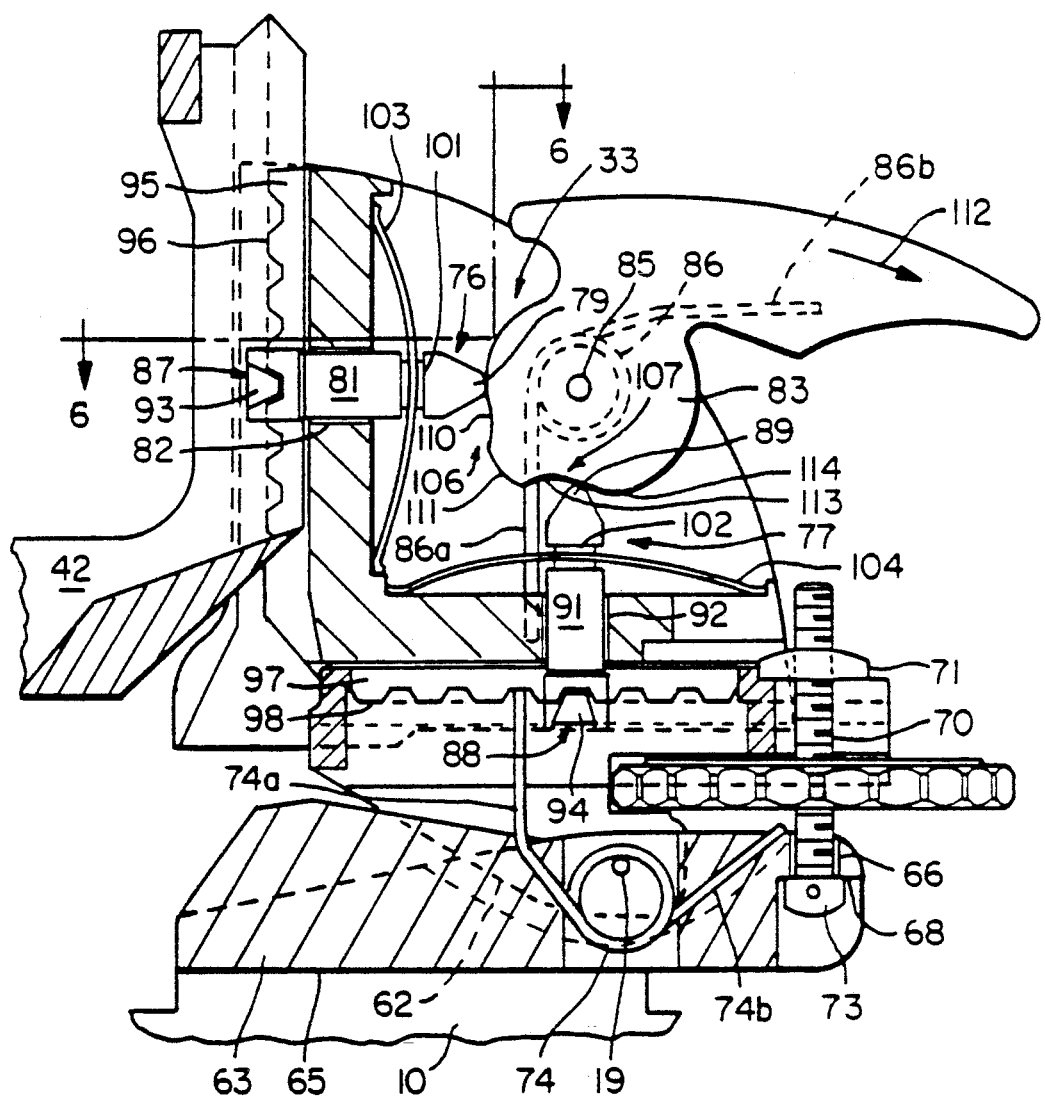
FIG. 5 is a sectional view of the mounting device as seen from the line 5—5 of FIG. 4 with several parts not sectioned for clarity.

Locking means 33 includes individual locking devices 76 and 77 for each of the two guide means 16 and 20, respectively, consisting of like parts. Referring particularly to locking device 76, as shown in FIGS. 2, 5 and 6, it may be seen that there is provided a pin 80 which has an elongated shank 81 which projects through an opening 82 (FIG. 6) in rear wall 27 of housing 24 and through slot 48 between side rails 44, 44. The pin 80 has an inner rounded end 79 for engagement with a cam member 83 formed integrally with a hand engagable lever 84 mounted for rotational movement about pivot pin 85 which extends between side walls 30a and 30b. The cam member 83 is disposed in the space 32 in the housing and the lever 84 projects substantially horizontally therefrom when it is in its normal locking or rest position. When the mounting device is grasped by the hand of the wearer during a mounting operation, the lever, at the same time, can be depressed by the hand to bring about unlocking of the locking devices 76 and 77, as will be described in more detail below. The lever is biased to the raised or locking position shown in FIGS. 2 and 5 by a coil spring 86 which encircles pin 85 and has tail ends 86a and 86b engaging the housing 24 and the lever 84, respectively.

The locking means for guide means 20 has similar parts to that of guide means 16 as described above, including a pin 90 having a shank 91 extending through opening 92 in bottom wall 28 of the housing. The pin 90 has an inner rounded end 89 which is also engaged by cam member 83.

At the outer ends of pins 80 and 90 there are provided short transverse sections 87 and 88, respectively, each of which projects from either side of its respective pin so as to be located behind rails 44, 44 of slide member 35, and rails 60, 60 of slide member 36, respectively. The transverse sections 87 and 88 of pins 80 and 90 are in the form of teeth 93 and 94, respectively, on either side of the pin shank and are pointed toward the inner end of the pin. These teeth engage with teeth provided by a racks 95 and 97 formed in the rear sides of the side rails of each associated slide member. Looking at FIGS. 5 and 6, it may be seen that side rails 44, 44 of the slide member 35 each have the rack 95 on the rear surfaces thereof defining teeth 96. Similarly, the bottom side of rails 60, 60 have the rack 97 formed therein so that there are a plurality of teeth 98 for engagement by the teeth 94 of the pin 90.

Pins 80 and 90 have annular grooves 101 and 102, respectively, encircling the shanks 81 and 91 thereof near their inner ends. Bowed leaf springs 103 and 104 are associated with pins 80 and 90, respectively, and are slotted so as to be received in grooves 101 and 102 at an intermediate portion of the springs. The springs 103 and 104 each have inner ends which engage the inside surfaces of the back and bottom walls 27 and 28 of the housing 24. Thus, when the lever 84 has not been manually activated so as to moved to one of two unlocking positions, as will be described in more detail below, springs 103 and 104 bias each of pins 80 and 90 to an inner position in which teeth 93 and 94 engage the teeth 96 and 98 of the slide members 35 and 36, respectively, so that the slide members are locked against longitudinal movement in tracks 25 and 26, respectively. In the view shown in FIG. 6, the spring 103 has been compressed by movement of the lever 84 to an unlocking position, and teeth 93 are disengaged from the teeth of the rack 95. Because matching teeth 93 and 96 and matching teeth 94 and 98 are wedge shaped, the strength of the resiliency of springs 103 and 104 can be selected to allow the matching teeth of one or both sets of teeth to in effect cam over each other if a predetermined excessive force is applied to the housing relative to the head support assembly or to the optical equipment relative to the housing. This provides as a safety feature to control the maximum force to be transferred to the wearer in the event, for example, the optical equipment or housing receives a severe blow.

It may be appreciated that because the teeth of the pin are pulled towards the racks on the back or under surfaces of the slide members the slides are pulled towards the inner surface of the tracks in which they are contained. Looking at the slide 35, as shown in FIG. 6, for example, it can be seen that this action pulls the surfaces 45b of the side edges of the slide member against the surfaces 40b of the track side walls 40 so that the engagement of the slanted surfaces has a wedging effect which tightly centres the slide member in its track.

The cam 83, which is of general circular outline, has two separate camming areas 106 and 107 spaced approximately 90° about the periphery of the cam and disposed for engagement by the inner ends of pins 80 and 90. Camming area 106, which is associated with pin 80 has a first depressed area 110 followed by a raised area 111 as cam member 83 rotates in the direction of arrow 112, i.e., lever 84 is pushed down from the normal locking position shown in FIG. 5. The relationship of the inner end of pin 80 and the camming area 110 is such that when the lever is in its raised locking position, the pin is allowed to move to its full inward position so that the teeth 93 are biased by the force of spring 103 into full engagement with teeth 96. Accordingly, the slide member 35 is locked against movement relative to the housing 24, or alternatively, the housing 24 can not be adjusted in an up and down direction. As the lever 84 is pushed all the way down to what might be termed a second unlocking position, the raised area 111 rotates to a position to push the pin sufficiently outward that the teeth 93 disengage the teeth 96 of the rack 95 thereby allow the relative up and down movement between the slide member and the track 25 of the housing 24. The spacing between the depressed area 110 and the raised area 111 is therefore selected to accomplish the full release of the locking means 76 when the lever is moved to the fully depressed or second unlocking position. Camming area 107 which engages the inner end of pin 90 has a depressed area 113 which allows pin 90 to be biased to its fully locking position when the lever is in its normal raised or locking position so that both locking means 76 and 77 are locked under normal conditions. Camming area 107 also has a raised area 114, but the spacing between the raised area 114 and the depressed area 113 normally engaged by the inner end of pin 90 is shorter than between the corresponding raised and depressed area of camming area 106. Thus, when the cam member 83 is rotated in the direction of the arrow 112 by lever 84 being pushed downwardly, the pin 90 is pushed outwardly to an unlocking position as the lever reaches an intermediate or first unlocking position. When pin 90 is pushed to its unlocking position, the teeth 94 of pin 90 fully disengage the teeth 98 of rack 97, so that slide member 36 can move longitudinally in track 26 of the housing 24 thereby allowing adjustment of the optical equipment in a direction parallel to the line of vision of the wearer.

It can be seen that with the camming effect obtained by the specific cam described above, it is possible for the wearer to selectively operate the locking means 76 and 77 by depressing the lever 84. The normal operation of the vertical and horizontal adjustment arrangement for the embodiment illustrated herein would be that on grasping the assembled optical equipment and mounting device, the wearer would wrap his hand around the housing 24 and squeeze to fully depress the lever 84 as he raised the assembly to a position to slide the track 25 over the slide member 35. When the housing has been lowered to the desired position to locate the optical equipment at the proper height relative to the line of vision, the wearer slightly releases the lever 84 so that the cam member 83 moves back from its second unlocking position to its first unlocking position in which pin 80 moves to fully lock the slide member 35 and housing 24 against further vertical movement. In the first unlocking position, the cam member 83 retains the locking pin 90 in its unlocking condition so that the wearer, by using his thumb, or fingers, depending on how he has grasped the assembly can move the base member 63 and the optical equipment carried thereby in the longitudinal direction relative to the housing while holding the lever in its partially depressed position.

By utilizing a different cam profile, it would be possible, of course, to provide allowance for independent adjustment in the vertical direction while locking means 77 is in a position to prevent adjustment parallel to the line of vision, or alternatively, an additional position could be provided to allow simultaneous unlocking of both locking means 76 and 77 as well as separate unlocking of each of the unlocking means. The specific arrangement does provide a combination of unlocking conditions, however, which allows easy mounting and rapid adjustment of the optical equipment using a single hand.

The selection of the size and/or spacing of the teeth in the racks 95 and 97 determine, of course, the increments of adjustment which can be achieved as the engaging teeth of the pins are moved relative to the rack from one locking position to the next consecutive position.

In the above described embodiment, the guide means between the housing and the head piece provides for the adjustment in the vertical direction while the guide means between the housing and the base member is used for accomplishing the longitudinal adjustment. It is apparent, however, that the direction of adjustment for the two guide means could be reversed. One advantage of the embodiment illustrated is that the slide member 35 extends vertically whereas if the roles were reversed, the slide member of the guide means between the housing and head piece would have to project horizontally, which would be less convenient.

Figure 9:
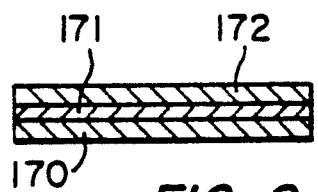
FIG. 9, which appears on the same sheet as FIG. 7, is a cross sectional view through the head piece as seen from line 9—9 of FIG. 7.
Figure 8:
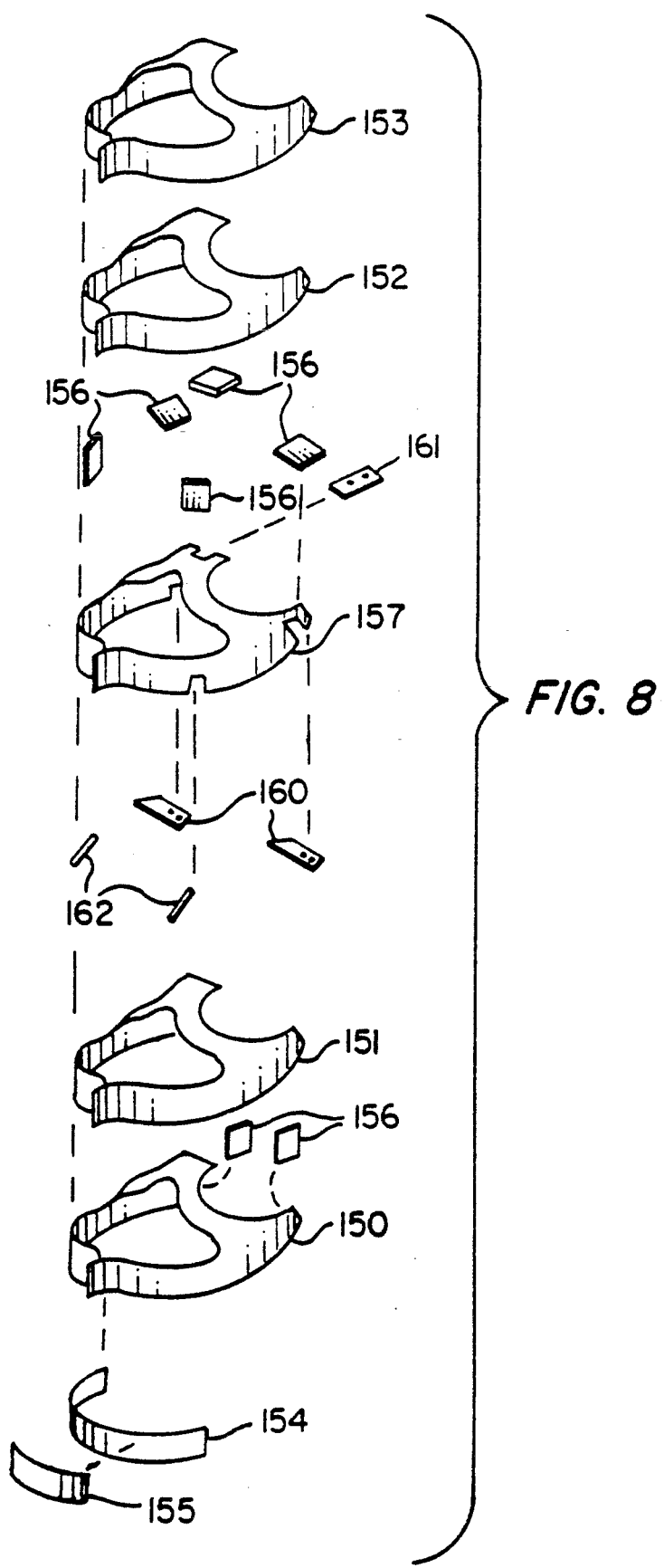
FIG. 8 is a view of the components used in fabricating a head piece which is one of the parts of the head support assembly of FIG. 7.

The head support head support assembly 15 is illustrated in FIGS. 1 and 7, and includes the head piece 47 which is more fully illustrated in FIGS. 8 and 9. The head piece 47 is formed of a laminated structure, as will be described in more detail below, and includes a U-shaped band portion 120 having a front section 121 which extends across the forehead of the wearer and rearwardly extending leg portions 122, 122 which are disposed along the opposite side of the head of the wearer. The head piece 47 further includes integrally formed upper band sections 123, 123 extending upwardly from the leg portions and joining a central portion 124. The upper band sections 123 and 123 and central portion 124 have inner surfaces for overlying the crown of the wearer. As will become more apparent from the description below, the front section 121 includes additional reinforcing so as to be relatively stiff and has a thickened central portion 125 to which slide member 35 is secured. The side leg portions 122, 122 and upper band sections are more resilient so as to make the head piece more adaptable to the head of different wearers.

The head support assembly further includes a back pad 126 which is located behind the wearer's head at the base of the skull, as can be seen from FIG. 1. The back pad 126 is curved in shape and can include a metal insert (not shown) and be produced by injection molding using a plastic material, such as that sold under the trade mark SANTOPRENE. The back pad 126 is provided with a central large opening 128 and an upper transverse upper slot 127. Top webbing or strap 130 is secured at an upper end to the rear of the central portion 124 of the head piece and passes through opening 127 and 128 so as to be attached thereto. This connection makes it possible to adjust the distance between the head piece 47 and the back pad 126. Side webbing is provided which includes a pair of side straps 131, 131 connected at upper ends to the rear ends of side leg portions 122, 122 of the head piece 47. The side straps pass downwardly and cross over through the back pad 126, and then extend forward on the opposite of the wearer's head towards a chin piece 132. The side straps 131, 131 terminate at ladderblock buckles 133, 133, and adjustment straps 135, 135 of resilient material, which connect to the ladderblocks as well, have eye means in the form of tri-rings 139, 139 secured to the forward ends thereof for connection over protuberances in the form of buttons 134, 134 on the opposite sides of the chin piece 132. The buttons 134, 134 are affixed to the chin piece 132 by screws 136, 136.

The chin piece includes an outer shell part 137 preferably molded from a strong rigid plastic material, such as a chemically resistant and stable polyetherimide resin sold under the trade mark ULTEM, which can be used for other parts of the mounting device and the head support assembly. The chin piece includes a readily replaceable insert 140 which is a molded plastic member formed of material such as that sold under the trade mark SANTOPRENE. Under the lower surface of the shell part there is provided a bore 141 which is horizontal and extends rearwardly from a front opening. A hold down cord 142 is fastened at its opposite upper ends to opposite sides of the head piece, and more specifically to the opposite sides of leg portions 122, 122 forward of the rear ends thereof, but slightly rearward of the front section 121. The cord is threaded through an opening 143 in a lock member 144 which is a cylindrically shaped plug shaped to be received in the bore 141 so that it can be inserted when the head support assembly is being mounted on the wearer's head so as to tie the front piece of the head piece to the chin piece.

Because of the resilient nature of the leg portions 122, 122 and the upper band portions 123, 123, the adjustment features provided in the webbing of the head support assembly, and the manner in which the side straps cross over to the opposite sides of the head of the wearer, the head support assembly can be adjusted to comfortably and securely attach the mounting device to substantially any shape of head.

In forming the head piece 47, there are cut from a carbon textile, such as that sold under the trade mark MUTUAL MI 1012, which is a 5.6 oz. plain weave, 4 pieces shown as shown at 150, 151, 152 and 153 in FIG. 8, and which, when shaped, are generally the shape of the head piece 47. Pieces 150 and 153 are cut at 90° to the weave and pieces 151 and 152 are cut at 45°. Patches 154 and 155 are also cut from the carbon textile, each cut at 45°, patch 154 being longer that 155. Seven patches 156 are also cut from the carbon textile at 90°. A part 157 is cut from a polyethylene fiber sheet of the type sold by Allied Signal under the trade mark SPECTRA 900, which is 7.3 oz.-8H satin.

The head piece 47 is formed by applying the above parts over an appropriately shaped mold (not shown) using an epoxy and hardener, such as that sold under the trade mark DUOCHEM #8015 to bond the parts together. The additional patches 154 and 155 are used in the front section 121 to provide the thicker area for attachment of the slide member 35 of the mounting device. The front section is, as a result, stiff as compared to the leg portions 122, 122. After pieces 154, 155, and two, of patches 156, pieces 150 and 151 have been applied to the mold in that order, side inserts 160 and top insert 161, which are formed of polytetrafluroethylene, sold under the trade mark TEFLON, are put in place to provide openings to receiver side straps 131, 131 and top strap 130. The piece 157 is then installed and inserts 162, also made of TEFLON, are inserted, the latter being used to provide connection openings for attachment of the cord 142. The remaining patches 156 are applied in the area of the inserts to provide additional reinforcing around the openings for the straps and cord ends. The pieces 152 and 153 are the last pieces to be applied. As is apparent from FIG. 9, the inner pieces 150 and 151 provide an inner hard two ply carbon textile layer 170, the piece 157 provides a middle tough layer 171, and the pieces 152, 153 provide an outer hard two ply carbon textile layer 172. This laminated structure provides a very durable head piece which will withstand high stress and heavy blows. Should an impact received by the head piece be sufficient to crack the carbon textile layers, the tough middle layer is capable of preventing a complete fracture of the head piece.

Although only one embodiment of the invention has been described, various alternatives will be apparent to those skilled in the art without departing from the spirit of the invention as defined in the appending claims.

The embodiments of the invention in which an exclusive property or privilege is claimed are defined as follows:

1. A mounting device for adjustably positioning an optical equipment on a viewer's head, said mounting device being mountable on a head support assembly worn by the viewer, said mounting device comprising a housing, first guide means disposed between said housing and mounting means connectable to said head support assembly for permitting movement of said housing relative to said head support assembly along a substantially vertical axis extending normal to a viewer's normal line of vision, a base means having attachment means for connecting said optical equipment to said base means, a second guide means disposed between said base means and said housing for permitting movement of said base means relative to said housing along a horizontal axis extending substantially parallel to said line of vision, locking means associated with each said guide means for independently preventing said relative movement in each guide means, and a manually operable unlocking member mounted in said housing and being movable from a locking position to unlocking positions for selectively actuating each of said locking means to effect unlocking of said locking means.

2. A mounting device as defined in claim 1, and further including a pivot connection between said base means and said second guide means for allowing tilting motion of the optical equipment relative to said housing about an axis transverse to the normal line of vision, and manual adjustment means for setting the amount of tilt.

3. A mounting device as defined in claim 1, wherein said first guide means includes a track means and a slide member for longitudinal sliding relative to said track means, one of said track means and said slide member having connecting means for fastening to said head support assembly and the other being formed in said housing.

4. A mounting device as defined in claim 3, wherein said slide member is provided with said means for fastening to said head support assembly, and said track means is formed in said housing.

5. A mounting device as defined in claim 4, wherein said slide member and said track means of said first guide means are separable to permit said housing to be attached to and removed from said head support assembly.

6. A mounting device as defined in claim 4, wherein said slide member of said first guide means includes vertically oriented rail means and said track means is a vertically disposed channel in said housing for longitudinal reception of said rail means.

7. A mounting means as defined in claim 6, wherein said second guide means includes a track means which is a horizontal channel extending parallel to said line of vision and a slide member which includes a rail means which is longitudinally slideable in said channel, and including means attaching said base means to said rail means.

8. A mounting device as defined in claim 7, wherein said locking means includes locking pin means mounted in said housing and one each being movable into a locking position for engaging said rail means of said guide means for preventing movement of said slide member relative to said track means.

9. A mounting device as defined in claim 8, wherein each rail means has a rack providing a series of teeth therealong, and each pin means has teeth means for engagement with the teeth in one of a series of positions of said rack in the locking position.

10. A mounting device as defined in claim 9, and including means biasing each pin means into the locking position.

11. A mounting device as defined in claim 10, and including a cam member having independent camming surfaces engagable, on movement of said cam member from a locking position, with an inner end of each pin means for urging each pin means against said biasing means to an unlocking position for permitting relative movement between said slide member and said track means.

12. A mounting device as defined in claim 11, and wherein said unlocking member includes a manually operable lever means carried by said housing for moving said cam member from the locking position to at least one unlocking position.

13. A mounting device as defined in claim 12, wherein said cam member is movable to a first unlocking position for moving one pin means to an unlocking position and to at least one addition position in which the other pin means is moved to an unlocking position.

14. A mounting device as defined in claim 13, wherein said pin means associated with the second guide means is moved to the unlocking position in the first unlocking position of said cam member, and both the pin means associated with the first and second guide means are moved to the unlocking position in the one additional position of the cam means.

15. A mounting device for adjustably positioning optical equipment on a viewer's head, said mounting device being mountable on a head support assembly worn by the viewer, said mounting device comprising a pair of guide means each including a slide member and track means for permitting relative back and forward movement of the slide member along a single axis in a direction of the longitudinal axis of the track means, a housing member, a base means having attachment means for connecting to said optical equipment, a first of said guide means being disposed between said housing member and said head support assembly, and a second of said guide means being disposed between the housing member and said base means, one of said first and second guide means being oriented to permit relative movement on a vertical axis normal to a line of vision of the viewer and the other being oriented to permit relative movement on a horizontal axis parallel to said line of vision, and releasable locking means associated with each guide means for preventing the relative movement in said guide means whereby on release of said lock means a level of the optical equipment and the distance of the optical equipment in front of the viewer may be selectively adjusted.

16. A mounting device as defined in claim 15, and further including a pivot connection between said base means and said second guide means for allowing tilting motion of the optical equipment relative to said housing about an axis transverse to the normal line of vision, and manual adjustment means for setting the amount of tilt.

17. A mounting device as defined in claim 16 and wherein said adjustment means includes a screw means connected between the base means and the second guide means, and a adjustment wheel fixed to said screw means and accessible to the wearer for turning the screw means and thereby varying the amount of tilt of the optical equipment about the transverse axis.

18. A mounting device as defined in claim 15, wherein one of the slide member and track means of said first guide means is adapted to be fixed to said head support assembly and the other is formed in said housing, said slide member and said track means of said first guide means being separable to permit said housing to be attached to and removed from said head support assembly.

19. A mounting device as defined in claim 18, wherein said slide member of the first guide means has means for fastening to said head support means and the associated track means is formed in said housing.

20. A mounting device as defined in claim 19, wherein said slide member of the first guide means includes vertically oriented rail means and said associated track means is a vertically disposed channel in said housing for longitudinal reception of said rail means.

21. A mounting means as defined in claim 20, wherein said second guide means includes a track means which is a horizontal channel extending parallel to said line of vision and a slide member which includes a rail means which is longitudinally slidable in said channel, and further comprising connecting means attaching said base means to said rail means.

22. A mounting device as defined in claim 21, wherein said connecting means between said rail means of said second guide means and said base means includes a horizontal pivot pin extending transverse to said line of vision, and further including means for adjustably holding the optical equipment carried by said base means at an angle of tilt relative to the normal line of vision.

23. A mounting device as defined in claim 21, wherein said releasible locking means includes locking pin means mounted in said housing and one each being movable into a locking position for engaging said rail means of said guide means for preventing movement of said slide member relative to said track means.

24. A mounting device as defined in claim 23, wherein each rail means has a rack providing a series of teeth therealong, and each pin means has means for engagement with the teeth in one of a series of positions of said rack in the locking position.

25. A mounting device as defined in claim 24, and including means biasing each pin means into the locking position.

26. A mounting device as defined in claim 25, and including a cam member having independent camming surfaces engagable, on movement of said cam member from a locking position, with an inner end of each pin means for urging each pin means against said biasing means to an unlocking position for permitting relative movement between said slide member and said track means.

27. A mounting device as defined in claim 26, and including a manually operable lever means carried by said housing for moving said cam member from the locking position to at least one unlocking position.

28. A mounting device as defined in claim 27, wherein said cam member is movable to a first unlocking position for moving one pin means to an unlocking position and to at least one addition position in which the other pin means is moved to an unlocking position.

29. A mounting device as defined in claim 28, wherein said pin means associated with the second guide means is moved to the unlocking position in the first unlocking position of said cam member, and both the pin means associated with the first and second guide means are moved to the unlocking position in the one additional position of the cam means.

* * * * *